United States Patent [19]

Dirschbacher et al.

[11] Patent Number: 5,974,904

[45] Date of Patent: Nov. 2, 1999

[54] LINEAR GUIDE DEVICE

[75] Inventors: Josef Dirschbacher, Knetzgau; Heinz Rossteuscher, Schwebheim, both of Germany

[73] Assignee: Deutsche Star GmbH, Schweinfurt, Germany

[21] Appl. No.: 08/919,984

[22] Filed: Aug. 28, 1997

[30] Foreign Application Priority Data

Sep. 6, 1996 [DE] Germany ............................ 196 36 272

[51] Int. Cl.$^6$ .................................................. F16H 25/20
[52] U.S. Cl. ......................................... 74/89.15; 74/89.22
[58] Field of Search ................................... 74/89.2, 89.22, 74/89.15, 424.8 R

[56] References Cited

U.S. PATENT DOCUMENTS

| | | | |
|---|---|---|---|
| 2,654,165 | 10/1953 | Lichtenberg ........................... | 74/89.15 |
| 2,885,920 | 5/1959 | Livingston . | |
| 3,010,328 | 11/1961 | Forey . | |
| 3,109,335 | 11/1963 | Gerchow . | |
| 4,512,208 | 4/1985 | Lipinski et al. . | |
| 4,604,027 | 8/1986 | Becker et al. ......................... | 74/89.15 |
| 4,878,390 | 11/1989 | Hauser . | |
| 4,934,835 | 6/1990 | Albert . | |
| 5,022,311 | 6/1991 | Fortmann et al. . | |
| 5,035,171 | 7/1991 | Gottling et al. . | |
| 5,074,160 | 12/1991 | Kasuga . | |
| 5,303,638 | 4/1994 | Green . | |
| 5,319,990 | 6/1994 | Veale et al. ........................... | 74/89.15 |
| 5,370,214 | 12/1994 | Katahira . | |
| 5,531,557 | 7/1996 | Springer ................................ | 74/89.15 |
| 5,720,202 | 2/1998 | Senjo et al. ........................... | 74/89.15 |

FOREIGN PATENT DOCUMENTS

| | | |
|---|---|---|
| 0106826 | 7/1986 | European Pat. Off. . |
| 0 263 215 | 4/1988 | European Pat. Off. . |
| 0302347 | 2/1989 | European Pat. Off. . |
| 0327705 | 8/1989 | European Pat. Off. . |
| 0412072 | 2/1991 | European Pat. Off. . |
| 0302846 | 10/1991 | European Pat. Off. . |
| 0482268 | 4/1992 | European Pat. Off. . |
| 0412072 | 11/1995 | European Pat. Off. . |
| 0773389 | 5/1997 | European Pat. Off. . |

(List continued on next page.)

OTHER PUBLICATIONS

Patent Abstracts of Japan, Abstract of Publication No. 58160665, Publication Date Sep. 24, 1983 from European Patent Office, 1 page.

Abstract of EP–482268, Publication Date Apr. 29, 1992, from DIALOG®File 351:Derwent DPI, 1 page.

Patent Abstracts of Japan, Abstract of Publication No. 02066359, Publication Date Jun. 3, 1990, from European Patent Office, 1 page.

Patent Abstracts of Japan, Abstract of Publication No. 02072254, Publication Date Dec. 3, 1990, from European Patent Office, 1 page.

Mannesmann Rexroth Deutsche Star Brochure "Linear Modules MKK . . . with Sealing Strip", No. RE82 411/04.95, 24 pages.

*Primary Examiner*—Tamara L. Graysay
*Assistant Examiner*—William C Joyce
*Attorney, Agent, or Firm*—Baker & Botts, L.L.P.

[57] ABSTRACT

A linear guide device comprises a guide base on which a runner assembly is movably guided in the direction of a longitudinal axis of the guide base. The runner assembly is driven along the longitudinal axis by a drive spindle that is in threaded engagement with a drive nut on the runner assembly. For additional support of the drive spindle there is a pair of spindle support units, one unit on either side of the runner assembly. A traction rope formed as an endless loop connects the two spindle support units and is reversed over a pulley at the ends of the guide base. The traction rope moves freely past the runner assembly such that the spindle support units are displaceable along the longitudinal axis by abutment of the runner assembly against one of the spindle support units, the other spindle support unit being towed along the guide base in following relation by the traction rope.

39 Claims, 11 Drawing Sheets

FOREIGN PATENT DOCUMENTS

| | | |
|---|---|---|
| 77001 | 1/1894 | Germany . |
| 1961441 | 6/1971 | Germany . |
| 24 04 244 | 8/1975 | Germany . |
| 39 14 889 | 11/1990 | Germany . |
| 9011413 | 12/1990 | Germany . |
| 9105342 | 10/1991 | Germany . |
| 4120500 | 11/1992 | Germany . |
| 43 18 932 | 12/1994 | Germany . |
| 29505345 | 6/1995 | Germany . |
| 19529097 | 5/1997 | Germany . |
| 272254 | 3/1990 | Japan . |
| 685705 | 11/1986 | Switzerland . |
| 1702027 | 12/1991 | U.S.S.R. ................................ 74/89.15 |
| 2106821 | 4/1983 | United Kingdom . |
| 9601198 | 1/1996 | WIPO . |

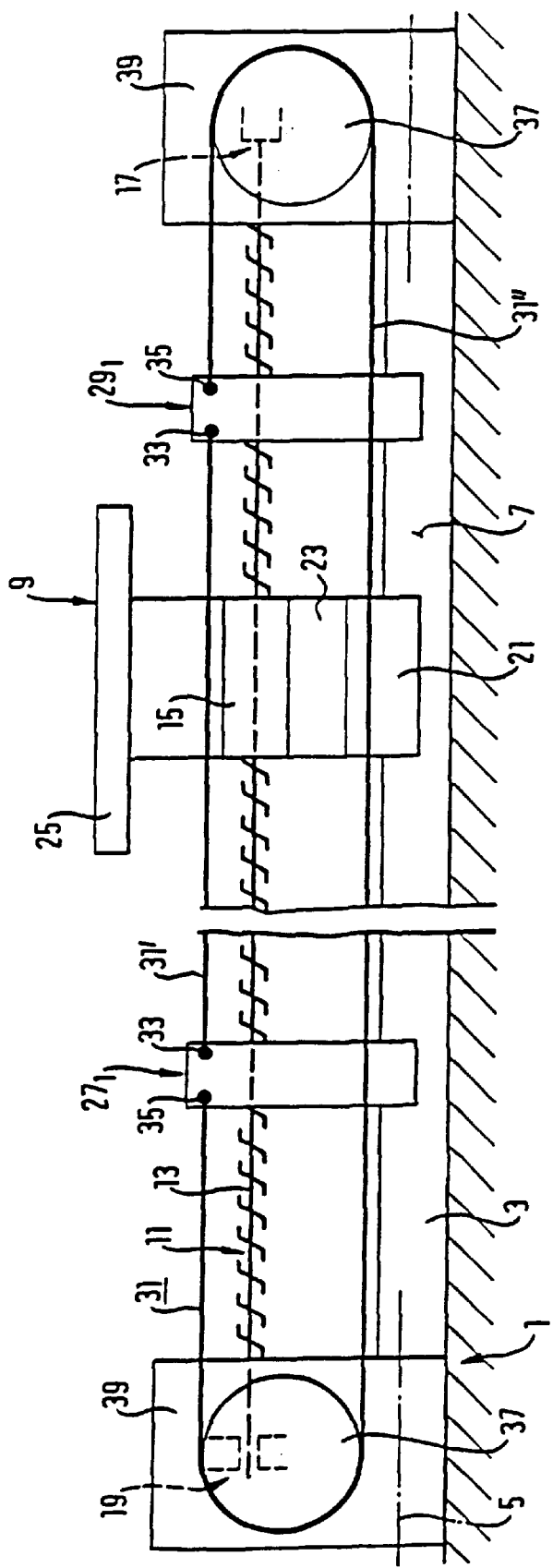

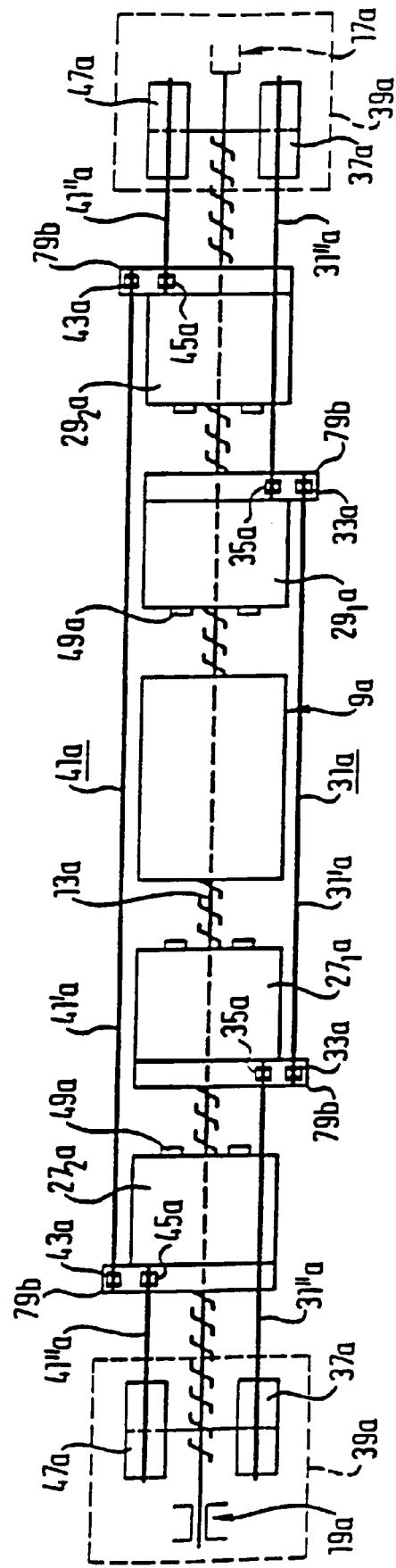

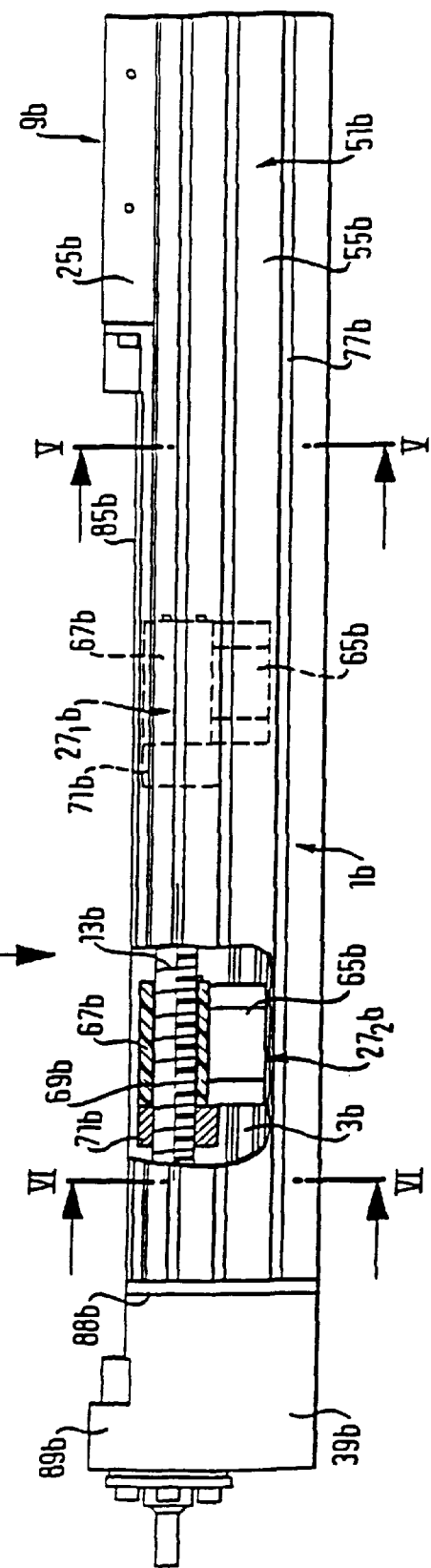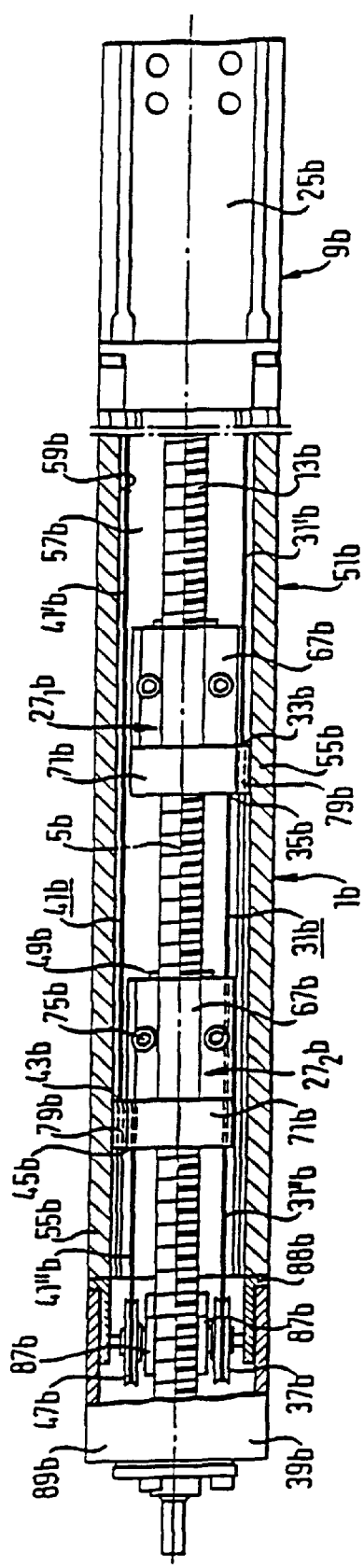

1

LINEAR GUIDE DEVICE

BACKGROUND OF THE INVENTION

The invention relates to a linear guide device comprising a guide base having a longitudinal axis, a runner assembly guided relative to said guide base in the direction of said longitudinal axis, a linear drive means for driving said runner assembly along said longitudinal axis, said linear drive means including a drive spindle supported at at least one of its ends axially fixedly, but rotatably, relative to said guide base, and including a nut being in threaded engagement with said drive spindle, said nut being connected with said runner assembly for movement in the direction of said longitudinal axis and being lockable or brakable against rotation with said drive spindle, and at least one spindle support unit at each of axially both sides of said runner assembly, each said spindle support unit being guided relative to said runner assembly on said guide base in the direction of said longitudinal axis, said spindle support units being displaceable along said longitudinal axis within a respective longitudinal distance between said runner assembly and a respective spindle end in dependence on movements of said runner assembly.

In such a linear guide device the maximum movement speed of the runner assembly relative to the guide base depends on the socalled critical speed of the drive spindle. When reaching the critical speed the drive spindle is set to self-induced vibration whose amplitude makes a precise positioning of the runner assembly impossible. Substantial factors which determine the critical speed are the diameter of the spindle and its length. The smaller the diameter/length ratio of the drive spindle is, the lower is the critical speed and, accordingly, the maximum movement speed of the runner assembly. Since particularly in the case of great lengths of the drive spindle (e.g. several meters) the spindle diameter cannot be enlarged at will for reasons of dimensions or weight, additional spindle support units are arranged in the support-free longitudinal portions of the drive spindle between the runner assembly and the spindle ends. The spindle support units represent additional support locations for the drive spindle and shorten the length of the support-free spindle portions. The critical speed of the drive spindle and the maximum movement speed of the runner assembly are increased in this manner. Furthermore, the spindle support units prevent deformation especially in the case of long drive spindles. The spindle support units are movable in relationship to the runner assembly and displaceable dependent on a movement of the runner assembly along the longitudinal axis so that they shorten the maximum displacement path of the runner assembly along the longitudinal axis, which is predetermined by the spindle length, only by their respective overall length.

STATEMENT OF THE PRIOR ART

FIGS. 12 and 13 show a known embodiment. Axially on both sides of a runner assembly $9s$, one each spindle support unit $27s$, $29s$ is arranged there, which together with the runner assembly $9s$ are guided on a guide rail $3s$. The runner assembly $9s$ is drivable along the guide rail $3s$ by means of a rotatable and axially fixed drive spindle $13s$, the drive spindle $13s$ being in engagement with a spindle nut which is axially fixed and non-rotatable with respect to the runner assembly $9s$. The two spindle support units $27s$, $29s$ are maintained at a fixed distance from each other by one or more rigid connecting rods $101s$. Within the longitudinal distance between the two spindle support units $27s$, $29s$ the runner assembly $9s$ is freely movable. As soon as the runner assembly $9s$ abuts against one of the spindle support units $27s$, $29s$, it takes along the two spindle support units $27s$, $29s$ in the same direction when continuing the movement along the guide rail $3s$, namely it pushes along the spindle support unit ahead of it in direct contact in the direction of movement, while it pulls along the spindle support unit to its rear at a distance. If the runner assembly $9s$ is moved further as far as the end of the guide rail $3s$, the two spindle support units $27s$, $29s$ are braked abruptly by abutment of the spindle support unit situated forward in the direction of movement against a suitable abutment surface fixed at the guide rail, the spindle support unit being rearward in the movement direction pushing due to inertia. The thrust forces thus exerted onto the connecting rods $101s$ could be considerable, especially in a vertical arrangement, if one takes into consideration that displacement speeds of the runner assembly $9s$ in a range of 1 m/s or more are no longer unusual, and in the case of heavy loads to be moved by the linear guide device also the spindle support units $27s$, $29s$ can be built accordingly solidly. In order not to buckle out when there is such a thrust load, the connecting rods $101s$ is must be very stiff and must have a correspondingly great cross-section which may lead to problems of space in a narrow operating area of the linear guide device. In this context there must be taken into consideration that also when intentionally braking the runner assembly before it reaches its end position, this intentional braking is not transmitted to the forerunning spindle support unit, which is why this forerunning spindle support unit may hit against an abutment with the momentum which it was given by the runner assembly still before the braking. Furthermore, the comparatively high weight of the connecting rods $101s$ is disadvantageous, as on the one hand the linear guide device becomes heavier as a whole, on the other hand the connecting rods $101s$ represent loads to be moved.

From EP 0 412 072 B1 a linear guide device having a spindle drive is known in which one each additional support nut for support of the spindle is provided on axially both sides of a runner assembly to be moved by the spindle drive. The two support nuts are neither coupled with each other for movement, nor are they in driving connection with the runner assembly. They are designed as ball nuts each being in threaded engagement with the spindle, which ball nuts move along the rotating spindle at about half the movement speed of the runner assembly. This speed reduction is achieved by a design in which the support nuts include an outer portion which is secured against rotation with the spindle, at the inner circumferential area of the outer portion several ball races are formed in parallel relationship with each other, which extend in orthogonal relationship to the spindle axis, i.e. they do not have a pitch. Between the outer portion and the spindle a ball cage is arranged which is rotatable relative to the outer portion and has recesses in which individual balls are received. These balls are in engagement with the ball races of the outer portion and with a helical thread at the outer circumferential area of the spindle. In order to achieve the stated speed reduction, the thread pitch of the spindle, the radial clearance or the radial bias, resp., of the balls between the races of the outer portion and the thread of the spindle as well as the radial clearance or the radial bias, resp., in the bearings between the ball cage and the outer portion must be suitably adapted to each other. This entails considerable expenditure of production.

In EP 0 412 072 B1 the support nuts are to be positioned constantly in the middle between the runner assembly and the respective spindle end. Since, however, the support nuts are not forcedly displaced by the runner assembly, it may happen that uneven distribution of the support nuts occurs in which a great longitudinal portion of the spindle does not have any additional support locations and thus the danger of deformation develops. This has to do with the fact that the support nuts do not move exactly at half the speed of the runner assembly and could possibly slip along the spindle to one spindle end.

OBJECT OF THE INVENTION

It is an object of the invention to permit positioning of the spindle support units along the drive spindle always in a way that deformation and self-induced vibrations of the drive spindle are effectively avoided using simple means and at little spatial requirement of these means.

SUMMARY OF THE INVENTION

To achieve this object there is provided a linear guide device comprising a guide base having a longitudinal axis, a runner assembly guided relative to said guide base in the direction of said longitudinal axis, a linear drive means for driving said runner assembly along said longitudinal axis, said linear drive means including a drive spindle supported at at least one of its ends axially fixedly, but rotatably, relative to said guide base, and including a nut being in threaded engagement with said drive spindle, said nut being connected with said runner assembly for movement in the direction of said longitudinal axis and being lockable or brakable against rotation with said drive spindle, at least one spindle support unit at each of axially both sides of said runner assembly, each said spindle support unit being guided relative to said runner assembly on said guide base in the direction of said longitudinal axis, said spindle support units being displaceable along said longitudinal axis within a respective longitudinal distance between said runner assembly and a respective spindle end in dependence on movements of said runner assembly, and at least one flexible traction means for at least one of mutually adapting axial movements of said spindle support units and establishing the dependence of axial movements of said spindle support units on axial movements of said runner assembly.

The inventive solution is suitable for optional cases of application, for example for carrying a tool or a workpiece in machining equipment or for guiding a measuring carrier in a measuring means. The at least one flexible traction means may be formed of a monofile wire of synthetics or metal, a rope, especially a wire rope, a band or a belt. Its advantages are light weight and small space required. These advantages become apparent especially in very great spindle lengths of several meters (for example up to 6 meters or more), when for comparison one takes into account the dimensions and the weight of the connecting rods of the known embodiments. Furthermore, the costs of the flexible traction means are not essential.

For linear guide devices having great spindle lengths it is recommendable to provide several additional support locations for the drive spindle on both sides of the runner assembly. In an embodiment of the invention there may be provided at least two spindle support units at each of both said axial sides of the runner assembly, two of these spindle support units each being closer to said runner assembly on either side thereof forming a pair closer to said runner assembly and two of these spindle support units each being more distant from said runner assembly on either side thereof forming a pair more distant from said runner assembly, the movements of said spindle support units being mutually adapted at least among one of these pairs. Due to the pair formation of the spindle support units and the mutual adaptation of movement among these pairs, identical support conditions for the drive spindle can be achieved in the two directions of movement of the runner assembly.

In a further embodiment of the invention there may be provided that the spindle support units of at least one pair of spindle support units arranged at either side of said runner assembly are mutually adapted in their movements by at least one flexible pair coupling means, closed to form a loop, optionally by interposition of loop closing means, said pair coupling means engaging with said spindle support units and being reversed by reversing means in the region of said spindle ends.

The traction means which is used as pair coupling means fulfills the same function in this embodiment as the rigid connecting rods in the known embodiment, namely to maintain the two spindle support units arranged at both sides of the runner assembly at a fixed distance from each other, and thus adapt their mutual movements. However, no stiff connection exists any more between the two spindle support units; rather, when one of the spindle support units abuts against one spindle end, the respective other spindle support unit is braked by that portion of the traction force transmitting pair coupling means which extends from the one spindle support unit via the reversing means to the other spindle support unit and there engages in a manner allowing traction. Even though, at first glance, this embodiment appears to have higher component expenditure as compared to the connecting rods of the known embodiment (because of the reversing means at the spindle ends), the considerable space and weight savings especially in the case of great spindle lengths must be taken into consideration which justifies this component expenditure. In the case that two or more pairs of spindle support units arranged at either side of the runner assembly are provided, the spindle support units of each of these pairs may be coupled with each other by means of a flexible pair coupling means.

The displacement of the spindle support units when moving the runner assembly may be achieved in that the spindle support units of a pair of spindle support units, whose movements are mutually adapted by means of a flexible pair coupling means, are displaceable by means of an abutment connection between said runner assembly and one of both said spindle support units.

In this solution when moving in the direction of one spindle end the runner assembly takes along the pair of spindle support units in the same direction and at the same speed. Since, in doing so, the runner assembly drags the spindle support unit situated to its rear along at an axial distance in the direction of movement, there is always guaranteed that, when the runner assembly approaches one spindle end, then along the spindle portion of the drive spindle between the runner assembly and the respective other spindle end there is at least one additional support location for the drive spindle at a sufficient distance from the runner assembly. If there are several pairs of spindle support units arranged at either side of the runner assembly, this principle of displacement of the spindle support units by an abutment connection may be expanded insofar that the spindle support units of at least one pair of spindle support units being more distant from said runner assembly, the movements of these spindle support units being mutually adapted by means of a flexible pair coupling means, may be displaceable by means of an abutment connection between a spindle support unit being closer to said runner assembly and one of both said spindle support units being more distant from said runner assembly.

In a further embodiment there may be provided that the spindle support units of at least one pair of spindle support units arranged at either side of said runner assembly are maintained at a fixed distance from each other by spacer means and that these spindle support units are in a driving connection with said runner assembly by means of flexible speed changing means, which driving connection, when said runner assembly is moving along said longitudinal axis, imparts a movement to said spindle support units in the same direction at a movement speed reduced in comparison with the movement speed of said runner assembly.

In this embodiment the spindle support units are permanently coupled with the runner assembly. When the runner assembly is braked, for examble when reaching a spindle end, the spindle support units also slow down forcedly. Thus, there is avoided that when reaching a spindle end the spindle support units located between the runner assembly and this spindle end abut unbraked against the respective spindle end.

The latter idea can be expressed generally in that when n spindle support units $UE_x$ are provided between said runner assembly and a first end of said guide base, namely spindle support units $UE_1$ through $UE_n$, whose distance from said runner assembly increases as the value of the index x increases from x=1 to x=n, in the case of considering an approach of said runner assembly to said first end of said guide base the following relationships are valid:

I. a) $v(UE_1) < v(L)$ $v(L)$ being the novement speed of said runner assembly and $v(UE_1)$ being the movement speed of the spindle support unit $UE_1$ closest to said runner assembly, and n being greater than or equal to 1; and b) in case $n \geq 2$ $$v(UE_{x+1}) < v(UE_x)$$

for all values of x between x=1 and x=n−1, $v(UE_{x+1})$ being the movement speed of a spindle support unit $UE_{x+1}$, and $v(UE_x)$ being the movement speed of a spindle support unit $UE_x$.

This means that at increasing value of the index x the speed of the spindle support units $UE_x$ is reducing. This results in a distribution of support locations between the runner assembly and the viewed first end of the guide base according to a rule which remains unchanged for different varying positions of the runner assembly.

An even distribution of the support locations results when in addition to the relationships I.a) and optionally I.b) the following relationships II and III apply:

II. $d \approx D/(n+1)$

D being the longitudinal distance of said runner assembly from said first end of said guide base, and d being the length of support-free portions of said drive spindle between said runner assembly and the spindle support unit $UE_1$ closest to said runner assembly, between said first end of said guide base and the spindle support unit $UE_n$ most distant from said runner assembly and optionally between two consecutive spindle support units $UE_x$ and $UE_{x+1}$; and III. $v(UE_x) = v(L) \cdot (n+1-x)/(n+1)$ for all values of x between x=1 and x=n.

In this case the spindle support units arranged between the runner assembly and the viewed first end of the guide base divide the longitudinal distance between the runner assembly and this first end of the guide base always in substantially equal partial distances, namely independent of the momentary position of the runner assembly along the longitudinal axis. If, for example, two spindle support units are present between the runner assembly and the first end of the guide base, the runner assembly moves at the normalized speed 1 when the drive spindle rotates, the spindle support unit $UE_1$ closest to the runner assembly moves at the normalized speed ⅔ and the following spindle support unit $UE_2$ moves at the normalized speed ⅓. Simultaneously, in this example, the spindle portion between the runner assembly and the first end of the guide base is subdivided at all times into three approximately equally great partial sections.

In order to guarantee an even distribution of the support locations for the drive spindle on axially both sides of the runner assembly, which support locations are formed by the spindle support units, it may be provided that in a middle position of the runner assembly between a first and a second end of the (guide base the spindle support units of said at least one pair have approximately equal distance from the runner assembly. In this case equal support conditions for both directions of movement of the runner assembly are the result.

The speed reduction due to the flexible speed changing means can be carried out in the way of a pulley block. Thus, it may be provided that in the presence of only one pair of spindle support units the driving connection between the runner assembly and each of these spindle support units includes a flexible speed changing means which extends from a fixed point at the guide base via a reversing means at a fixed point of the respective spindle support unit to a fixed point at the runner assembly. In this arrangement of the flexible speed changing means a movement at half the speed of the runner assembly is imparted to the spindle support units. If, for the special case of application, more than two spindle support units are required, it may be provided that in the presence of two pairs of spindle support units, the driving connection for each group of two spindle support units $UE_1$, $UE_2$ at both sides of said runner assembly includes two flexible speed changing means, one of which extends from a fixed point at said runner assembly via a reversing means at a fixed point of said spindle support unit $UE_2$, from there back to a further reversing means at a fixed point of said guide base and from there to a fixed point at said spindle support unit $UE_2$, and the other of which extends from a fixed point at said guide base via a reversing means at a fixed point of said spindle support unit $UE_2$ back to a fixed point at said spindle support unit $UE_1$. If for the speed of the runner assembly the normalized value 1 is applied again, in this case the support units $UE_1$ on both sides of the runner assembly move at the normalized speed ⅔, whereas the spindle support units $UE_2$ move at the normalized speed ⅓.

The spacer means may comprise a rigid connecting member. This connecting member, for example, can be a simple connecting rod. However, it can have a weaker cross-section in comparison with the connecting rods which are used in the initially discussed known embodiment, since it does not have to receive any great thrust forces, but merely serves the purpose of maintaining the fixed distance between the two spindle support units. In this context there must be taken into account that due to the permanent coupling of the spindle support units to the runner assembly when braking the runner assembly the respective forerunning spindle support unit is also braked so that the connecting rod must receive reduced thrust forces, at the most.

It is also conceivable that the spacer means include at least one flexible pair coupling means closed to a loop, optionally by interposition of loop closing means, which pair coupling means engages with the spindle support units of the respective pair and is reversed by reversing means in the region of said spindle ends. This solution represents a combination of a flexible pair coupling means with a flexible speed changing means and allows to do without any stiff connecting member between the spindle support units, since one can manage exclusively with traction force transmitting means for coupling the spindle support units amongst each other and with the runner assembly.

Frequently it will be sufficient if a spindle support unit comprises a spindle embracing member made of a material which slides easily, especially synthetics, said spindle embracing member having a through-bore, said spindle extending through said through-bore for sliding movement. This, for example, can be a slide sleeve. It is also thinkable, however, to provide in a spindle support unit a support nut being in threaded engagement with the drive spindle. Then, one can use a nut as a support nut which is standard in trade, as it finds application, for example, also in the drive of the runner assembly. Particularly, a ball nut having at least one endless row of balls can be used as support nut. Such a support nut can guarantee perfect guidance of the drive spindle in the spindle support unit. However, the following must be considered in this context: In the case of using a flexible speed changing means, a forced co-movement of the spindle support unit results when the runner assembly moves, and that at a lower speed than the runner assembly. If the displaceability of the spindle support unit is guaranteed by an abutment connection with the runner assembly or a spindle support unit being closer to the runner, temporarily the situation of a standstill of the spindle support unit arises when the runner assembly moves. If now the support nut were locked against rotation with the drive spindle, the support nut would move at the same speed as the runner assembly when the drive spindle rotates. Therefore, a compensation possibility must be created, so that the respective spindle support unit can move at a speed (optionally speed zero) different from the runner assembly. This compensation possibility may be that the support nut is supported in the spindle support unit axially fixedly, but rotatably such that a speed difference corresponding to a given interdependence between an axial movement of said runner assembly and an axial movement of said spindle support unit, namely a speed difference between these two axial movements (for example standstill of said spindle support unit when said runner assembly moves axially), is permitted by rotation of said support nut. Herein the pitch of the screw drive formed of the drive spindle and the support nut, the frictional conditions between support nut and drive spindle determined by the radial clearance or radial bias, as well as the frictional conditions within the bearings arranged between the support nut and the spindle support unit will be suitably adapted to each other in order to be able to realize the respective case constellation (for example standstill of the spindle support unit during longitudinal movement of the runner assembly).

The use of a support nut in a spindle support unit further holds the advantage of high resistance to wear. If one uses a slide sleeve for the support of the drive spindle, an abrasion of the slide sleeve can occur due to material warping, particularly with rolled spindles, i.e. spindles having a threaded nut manufactured by a roll tool, which warpings can result between individual windings from rolling the spindle. This abrasion in the case of ground spindles is less. However, by use of a support nut, especially a ball nut, the wear in the spindle support unit can be reduced substantially.

The guide base may comprise at least one guide surface on which the runner assembly as well as the spindle support units are guided. Alternatively, at least one separate guide surface each may be provided on the guide base for guiding the spindle support units and the runner assembly. Instead of guiding the runner assembly directly on the guide base, it is also conceivable that on said guide base a secondary guide rail is guided on which two spindle support units are arranged fixedly, and that said runner assembly is guided on this secondary guide rail for movement in the direction of said longitudinal axis relative to both said spindle support units.

The invention is not limited to a certain design of the guide base. The guide base, for example, may be formed of a solid carrier bed on which one or more guide rails are mounted. In a further embodiment there may be provided that said guide base includes a guide housing having walls defining a guide cavity and in that said runner assembly and said spindle support units are received within said guide cavity, said runner assembly extending through a longitudinal opening of said guide housing and being adapted outside of said guide cavity for receiving an object to be moved in the direction of said longitudinal axis. In this context, within said guide cavity at least one guide rail may be mounted to said guide housing for guiding at least one of said runner assembly and said spindle support units. The runner assembly and the spindle support units may be guided -on the guide base by roll members, for example by balls, barrel-shaped rollers or disc-shaped runner rollers. Especially, at least one of the runner assembly and the spindle support units may comprise at least one endless roll member loop for their guidance on the guide base. But also a sliding support of the runner assembly and the spindle support units is thinkable.

The at least one flexible traction means may run at least partly within the guide cavity. This offers itself because in this way the at least one flexible traction means is protected from damage and dirt. It is advantageous when said at least one flexible traction means is received at least on a part of its length within a traction means receiving groove which is open towards said guide cavity and is formed in one of said walls defining said guide cavity. On the one hand, the at least one flexible traction means is protected perfectly in the traction means receiving groove, on the other hand in this way the at least one flexible traction means can be guided at least partly within the guide cavity also when there is little room. When the guide housing is a sectional housing having one or several longitudinally extending fastening grooves, one of these fastening grooves may serve as traction means receiving groove without any added constructional expenditure.

The traction means received in the traction means receiving groove or its respective part may be movably guided past, or fixed to, a contour portion of at least one of said runner assembly and a spindle support unit, said contour portion being adjacent said traction means receiving groove. In this context, said traction means received within said traction means receiving groove, or its respective part, may be fixed to at least one of a projection of said runner assembly and a projection of at least one spindle support unit, which projection extends into said traction means receiving groove.

A manner of protected accommodation for the at least one flexible traction means may be that said at least one flexible traction means extends on at least a part of its length within a traction means receiving channel separate from said guide cavity. This solution offers itself particularly if the at least one flexible traction means is designed as flexible pair coupling means. Then, a returning portion of this flexible pair coupling means may be guided in the traction means receiving channel and may exit from the traction means receiving channel in the region of the pertaining reversing means.

In order to protect the components received in the guide cavity from entry of dirt, components such as the runner assembly, the spindle support units as well as optionally the at least one flexible traction means, the guide cavity may be covered by a cover band in the region of its longitudinal opening, which cover band either is in driving connection with the runner assembly or is passed through the runner assembly.

In order to simplify the assembly of the linear guide device according to the invention there may be provided that at least one of said flexible traction means and a cover band being in driving connection with said runner assembly runs in at least one end portion of said guide housing over a reversing means encapsulated by an encapsulating means, said reversing means being mountable separately from said encapsulating means in the respective end portion of said guide housing, and that said encapsulating means, after having mounted said reversing means, is mountable in encapsulating position with respect to said reversing means to at least one of said guide housing and a guide rail of said guide housing and said reversing means. For then, the reversing means can be mounted first without any respective encapsulating means, so that subsequently at least one of the flexible traction means and the cover band can be applied without the encapsulating means being an obstacle. The encapsulating means may be mounted thereafter.

The previously discussed principle to design a spindle support unit with a support nut being in threaded engagement with the drive spindle is to enjoy independent protection in the scope of the invention. Therefore, there is further provided a linear guide device, comprising a guide base having a longitudinal axis, a runner assembly guided relative to said guide base in the direction of said longitudinal axis, a linear drive means for driving said runner assembly along said longitudinal axis, said linear drive means including a drive spindle supported at at least one of its ends axially fixedly, but rotatably, relative to said guide base, and including a nut being in threaded engagement with said drive spindle, said nut being connected with said runner assembly for movement in the direction of said longitudinal axis and being lockable or brakable against rotation with said drive spindle, and at least one spindle support unit guided on said guide base in the direction of said longitudinal axis relative to said runner assembly, said spindle support unit being displaceable along said longitudinal axis within a longitudinal distance between said runner assembly and a spindle end in dependence on movements of said runner assembly, said at least one spindle support unit including a support nut in threaded engagement with said drive spindle, said support nut being supported in said spindle support unit axially fixedly, but rotatably such that a speed difference corresponding to a given interdependence between an axial movement of said runner assembly and an axial movement of said spindle support unit, namely a speed difference between these two axial movements (for example standstill of said spindle support unit when said runner assembly moves axially), is permitted by rotation of the support nut.

This principle may be applied to a support unit which comprises a ball screw drive with at least one endless row of balls, which on a part of its lengths follows a thread path on the inner circumferential surface of said support nut and extends on a remaining path through a return channel of said support nut.

The various features of novelty which characterise the invention are pointed out with particularity in the claims annexed to and forming a part of the disclosure. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE DRAWINGS

FIG. 1 schematically shows a first embodiment of the linear guide device according to the invention having two spindle support units arranged at both sides of a runner assembly, the movements of the spindle support units being mutually adapted via a flexible pair coupling means;

FIG. 2 schematically shows a further embodiment of the linear guide device according to the invention which supplements the embodiment according to FIG. 1 insofar as it additionally comprises a second pair of spindle support units arranged at both sides of the runner assembly, the movements of these spindle support units being also mutually adapted via a flexible pair coupling means;

FIG. 3 is a side view of an example of realisation of a linear guide device according to FIG. 2;

FIG. 4 is a top view of the linear guide device of FIG. 3;

DETAILED DESCRIPTION OF PREFERRED EMBODIMENTS

Figure 5:
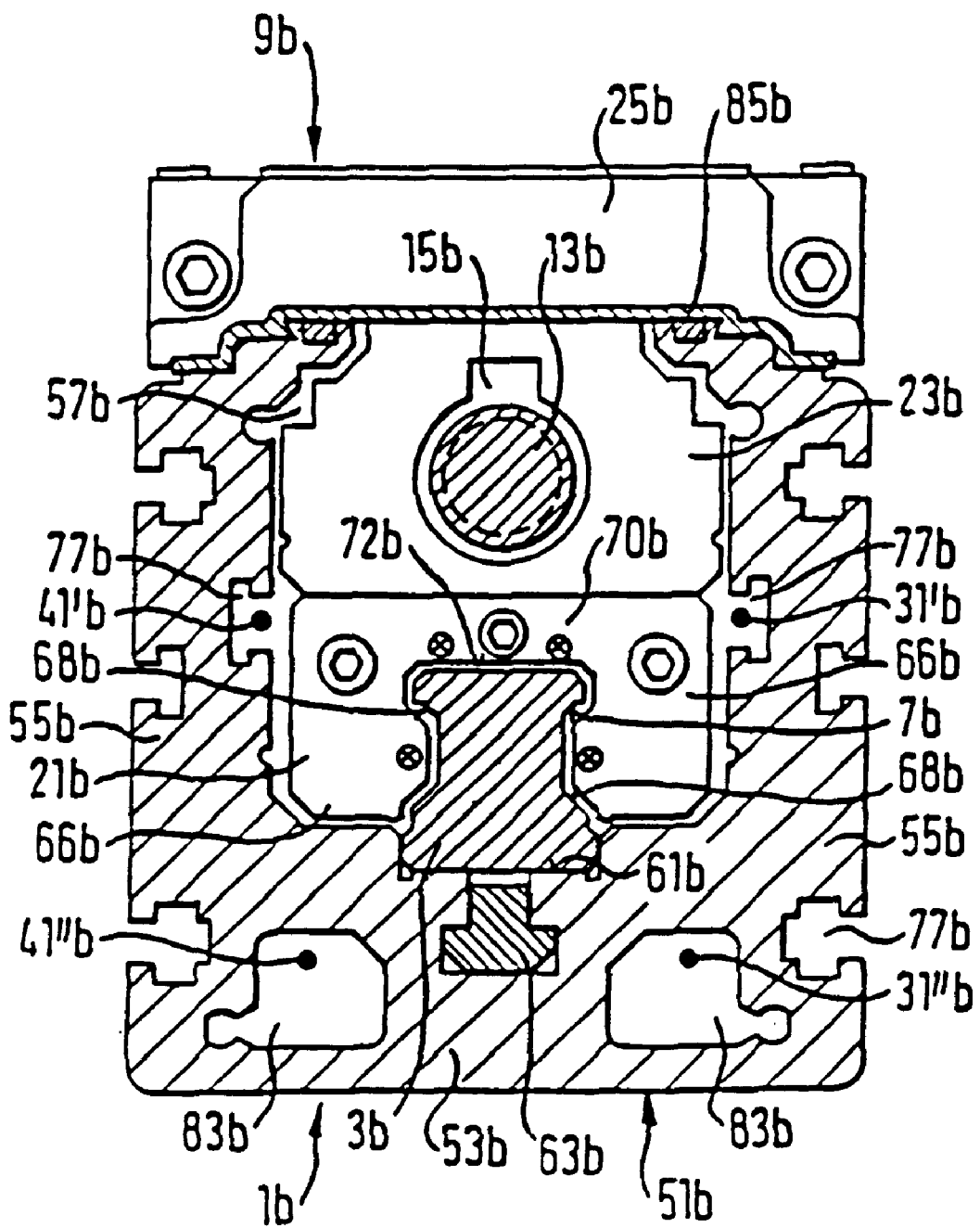
FIG. 5 is a section along the line V—V of FIG. 3.

FIG. 1 shows a guide base 1 on which a guide rail 3 having a longitudinal axis 5 is mounted. The guide rail 3 comprises at least one guide surface 7 on which a runner assembly 9 is guided for sliding movement along the longitudinal axis 5. The driving of the runner assembly 9 along the longitudinal axis 5 is achieved by means of a spindle drive means 11 which includes a drive spindle 13 having a spindle axis in parallel relationship with the longitudinal axis 5 as well as a nut 15 being in threaded engagement with the drive spindle 13. The drive spindle 13 is rotatably supported at its ends, namely at its end which is the right end in FIG. 1 in a schematically indicated fixed bearing 17 which holds the drive spindle 13 axially fixedly, and at its end which is the left end in FIG. 1 in a movable bearing 19 also only schematically indicated in FIG. 1, which allows axial compensation movements of the drive spindle 13 for example due to thermal expansion. On the side of the fixed bearing 17 rotation can be imparted to the drive spindle 13 by a drive motor which is not shown in greater detail, for example an electric motor. The nut 15 is connected with the runner assembly 9 axially fixedly and secured against rotation so that when the drive spindle 13 rotates the runner assembly 9 is moved at a speed along the longitudinal axis 5 which corresponds to the product of the speed of the drive spindle 13 and the pitch of the thread formed between the drive spindle 13 and the nut 15. The runner assembly 9 includes a runner 21 supported for rolling or sliding movement on the guide rail 3, which runner is connected to a connection member 23 receiving the nut 15. On the connection part 23 a table 25 is mounted on which an object to be moved, for example a tool or a workpiece, can be mounted. The runner assembly 9, however, does not need to be embodied in this way as carrier of loads to be moved. Instead of the table 25 an engaging member can be provided which is in engagement with the object to be moved without assuming any load-carrying function.

The spindle drive formed of the drive spindle 13 and the nut 15 is preferably designed as a roll member screw drive, especially a ball screw drive, having at least one roll member loop which is equipped with an endless row of roll members. Herein, the outer circumferential surface of the drive spindle 13 can comprise at least one threaded groove extending helically about the spindle axis in which threaded groove the roll members of the roll member loop engage. But it is also thinkable to use a drive spindle 13 which is smooth at its outer circumferential surface in which the load-transmitting roll members are radially biased between the nut 15 and the drive spindle 13 so that an axial progression of the nut 15 due to the frictional engagement between these rolling members and the smooth outer circumferential surface of the drive spindle 13 is made possible.

In order to avoid the risk of deformation in the case of long or very thin drive spindles and to bring up the critical speed of the drive spindle 13 at which it is excited to produce self-induced vibrations to a range which allows sufficient displacement speeds of the runner assembly 9 along the longitudinal axis 5 also in the case of small diameter/length ratios of the drive spindle 13, one each spindle support unit $27_1$ and $29_1$ is provided on both sides of the runner assembly 9 which constitute additional support locations for the drive spindle 13 in the free spindle sections between the runner assembly 9 and the respective spindle end. The spindle support units $27_1$ and $29_1$ are movable along the longitudinal axis 5 in relation to the runner assembly 9, the spindle support units $27_1$ and $29_1$ being guided on the guide surface 7 of the guide rail 3. By means of a flexible pair coupling means 31 designed as a traction rope, the two spindle support units $27_1$ and $29_1$ are coupled with each other. In this context, a first traction rope section 31' extending between the two spindle support units $27_1$ and $29_1$ is movably passed by the runner assembly 9 and secured to fixed points 33 at the spindle support units $27_1$, $29_1$. A second traction rope section 31" is secured to fixed points 35 at the two spindle support units $27_1$, $29_1$ and reversed by reversing rollers 37 at both ends of the guide base 1. Between the two reversing rollers 37 the second traction rope section 31" constitutes a returning portion of the traction rope 31 closed to form an endless loop, the upper portion of the traction rope 31 being formed of the first traction rope section 31'. By means of the traction rope 31 the two spindle support units $27_1$ and $29_1$ are maintained at a fixed distance from one another and experience a synchronous movement as soon as one of the spindle support units $27_1$, $29_1$ is moved.

When the runner assembly 9 moves to the left from the position shown in FIG. 1 when rotating the drive spindle 13, the spindle support unit $27_1$ and therewith also the spindle support unit $29_1$ remain at a standstill until the runner assembly 9 abuts against the spindle support unit $27_1$. When the runner assembly 9 is moved further along, the two spindle support units $27_1$, $29_1$ are taken along in the same direction of movement, the runner assembly 9 pushing the spindle support unit $27_1$ situated ahead of it in direct contact, the spindle support unit $29_1$ situated to its rear following at a maximum distance. When the runner assembly 9 then reaches the left end of the guide base 1, the spindle support unit $27_1$ comes to rest at an abutment or buffer of this left end of the guide base 1 which abutment or buffer is not shown in greater detail, the second traction rope section 31" exerting a retaining force on the spindle support unit $29_1$ which brakes this spindle support unit. When the runner assembly 9 moves in reverse direction along the longitudinal axis 5, i.e. to the right in FIG. 1, respectively reversed relationships result.

In the embodiment of FIG. 1 the drive spindle 13 is always supported in an intermediate region (even though not exactly in the center between the runner assembly 9 and the respective end of the guide base 1) by the spindle support unit $27_1$ or $29_1$ positioned to the rear of the runner assembly 9 in the direction of movement, so that the danger of deformation of the drive spindle 13 is effectively avoided, and there are no support-free spindle sections which are too long, when the runner assembly 9 is already near an end of the guide base 1.

The fixed bearing 17 and the movable bearing 19 for the drive spindle 13 can be combined with the reversing rollers 37 and optionally with tensioning means for tensioning the traction rope 31 in end units 39 which are mountable as contructional units at the ends of the guide base 1.

For the embodiments shown in the further figures the same reference numerals, supplemented by a small letter are used, as far as the same components or components having the same effect are addressed. In order to avoid repetitions, reference is made to the foregoing description of these components.

FIG. 2 is a schematic illustration of a linear guide device at an imagined line of vision from above. For reasons of clarity the guide base is not shown in this schematic illustration. It is a matter of course, however, that also here at least one guide member comparable with the guide rail 3 of FIG. 1 is provided for guiding the runner assembly and the spindle support units.

The embodiment of FIG. 2 differs from that of FIG. 1 substantially in that in addition to the spindle support units $27_1a$ and $29_1a$ a further, second pair of spindle support units $27_2a$ and $29_2a$ arranged at either side of the runner assembly $9a$ is provided for support of the drive spindle $13a$. The spindle support unit $27_2a$ is arranged between the spindle support unit $27_1a$ and the end of the guide base at the left in FIG. 2, whereas the spindle support unit $29_2a$ is arranged between the spindle support unit $29_1a$ and the end of the guide base at the right in FIG. 1. Thus, the spindle support units $27_1a$ and $29_1a$ constitute a pair of spindle support units closer to the runner assembly and the spindle support units $27_2a$ and $29_2a$ constitute a pair of spindle support units more distant from the runner assembly. Corresponding to the traction rope 31a a further traction rope 41a is provided in order to couple the two spindle support units $27_2a$ and $29_2a$ with each other. In this context, a first traction rope section 41'a is movably passed by the runner assembly 9a and the spindle support units $27_1a$, $29_1a$, extends between the two spindle support units $27_2a$ and $29_2a$, and engages at fixed points 43a at the spindle support units $27_2a$, $29_2a$. A second traction rope section 41"a is secured to fixed points 45a at the spindle support units $27_2a$, $29_2a$ and is guided over a further set of reversing rollers 47a which are arranged at the ends of the guide base together with the reversing rollers 37a. Due to the selected line of vision the returning portion of both traction ropes 31a and 41a cannot be seen.

The same as the traction rope 31a, the traction rope 41a also serves as a flexible pair coupling means for the spindle support units $27_2a$, $29_2a$ and connects these two spindle support units $27_2a$, $29_2a$ for common synchronous movement. When the runner assembly 9a moves to the left in FIG. 2, the runner assembly 9a at first abuts against the spindle support unit $27_1a$ and then takes along the pair of spindle support units $27_1a$, $29_2a$ being closer to the runner assembly at the same speed. In this connection the two spindle support units $27_2a$ and $29_2a$ stand still at first. Then, the spindle support unit $27_1a$ which the runner assembly 9a pushes ahead of itself reaches the spindle support unit $27_2a$ and abuts thereon. Then, also the pair of spindle support units $27_2a$, $29_2a$ more distant from the runner assembly starts moving, and that at the same speed as the runner assembly 9a. The spindle support units $29_1a$ and $29_2a$ then are at a maximum distance from the runner assembly 9a and from each other so that in the direction of movement behind the runner assembly 9a optimum support of the drive spindle 13a is always provided. When the runner assembly 9a moves to the right in FIG. 2, correspondingly reversed conditions apply. At the end faces of the spindle support units $27_1a$ through $29_2a$ buffer members 49a can be attached for attenuating the impact among each other or with the runner assembly 9a.

FIGS. 3 to 6 show a concrete example of realisation of the linear guide device illustrated only schematically in FIG. 2. In this embodiment the guide base 1b is formed of a sectional guide housing 51b having a bottom wall 53b and two side walls 55b being approximately perpendicular to the bottom wall and parallel to each other. The bottom wall 53b and the side walls 55b define between themselves a guide cavity 57b in which the runner assembly 9a as well as the spindle support units are received. Since FIGS. 3 and 4 only show one half of the linear guide device, merely the spindle support units $27_1b$ and $27_2b$ are recognizable, but, of course, spindle support units corresponding to the spindle support units $29_1a$ and $29_2a$ of FIG. 2 are provided as well. In the area of the ends of the side walls 55b distant from the bottom wall 53b, the guide cavity 51b comprises a longitudinal opening 59b (see FIG. 4) through which the connection of the connecting member 23b of the runner assembly 3b to the table 25b is made. The guide rail 3b is inserted into a bottom groove 61b in the side of the bottom wall 53b which faces the guide cavity 57b, and is secured there by means of fastening screws.

Figure 6:
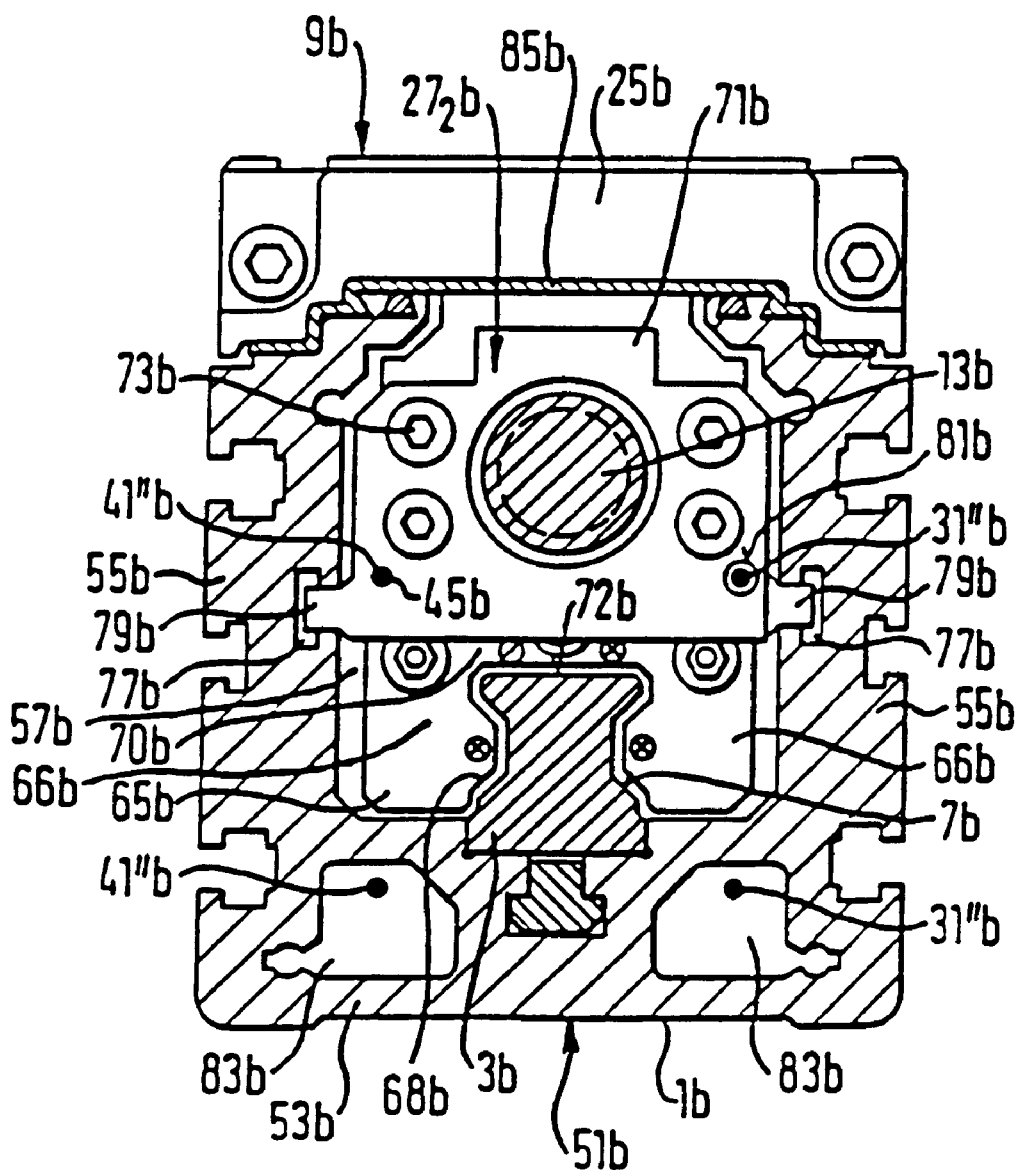
FIG. 6 is a section along the line VI—VI of FIG. 3.

The spindle support units $27_1b$ and $27_2b$ each comprise a guide member 65b which guides the respective spindle support unit on the guide rail 3b. The guide members 65b and the runner 21b of the runner assembly 9b may be identical components, series elements available in trade can be used. FIGS. 5 and 6 show that the runner 21b of the runner assembly 9b and the guide members 65b of the spindle support units embrace the guide rail 3b in the shape of a U, wherein they are adjacent to side faces 68b of the guide rail 3b with two flange members 66b arranged at both sides of the guide rail 3b, and wherein they are adjacent to a head face 72b of the guide rail 3b with a bridge member 70b connecting the flange members 66b, the head face 72b being remote from the bottom wall 53b. In the flange members 66b of the runner 21b and the guide members 65b endless roll member loops can be integrated whose load-transmitting roll member portions are in rolling engagement with the guide surfaces 7b provided on the side faces 68b of the guide rail 3b. For support of the drive spindle 13b the spindle support units comprise a support member 67b which is fixed to the respective guide member 65b and is penetrated by the drive spindle 13b. In the embodiment of FIGS. 3 to 6 the support member 67b is embodied as a sliding sleeve, preferably made of synthetics, having a through-bore 69b whose diameter is slightly larger than the diameter of the drive spindle 13b and in which the drive spindle 13b is guided for sliding movement. Further, the spindle support units comprise a clamping member 71b attached to an end face of the respective spindle support unit, which clamping member 71b provides the fixed points 33b, 35b and 43b, 45b, respectively, for affixing the traction ropes 31b and 41b. The clamping member 71b can be fixed to the support member 67b or to the guide member 65b of the respective spindle support unit with the help of fastening screws 73b (see FIG. 6). Further fastening screws 75b (see FIG. 4) serve to affix the support member 67b to the guide member 65b of the respective spindle support unit.

From FIGS. 5 and 6 there is apparent that the guide housing 51b comprises a plurality of undercut T-section grooves 77b at its outer side as well as at its inner side facing the guide cavity 57b. These sectional grooves 77b can be used for fixation of the guide housing 51b to a higher construction or for fixing of add-on parts to the guide housing 51b. Sectional grooves 77b provided on the inner side of the side walls 55b facing the guide cavity 57b furthermore serve to receive the upper portion 31'b and 41'b, respectively, of the traction ropes 31b and 41b. In doing so the tight space within the guide cavity 57b can be taken into account on the one hand, on the other hand protection of the traction ropes 31b, 41b from damage can be guaranteed. In order to maintain the upper portion 31'b or 41'b of the traction ropes 31b and 41b in their respective sectional groove 77b, the clamping members 71b of the spindle support units comprise a nose-like projection 79b which extends into the respective sectional groove 77b, at which projection 79b the fixed point 33b is provided in the case of the upper portion 31'b of the traction rope 31b, and in the case of the upper portion 41'b of the traction rope 41b the fixed point 43b is provided. For better understanding, these projections 79b are additionally drawn into the illustration of FIG. 2.

The second traction rope section 31"b of the traction rope 31b is secured to the fixed point 35b at the clamping member 71b of the spindle support unit $27_1b$ and is movably guided through a through-hole 81b (see FIG. 6) in the clamping member 71b of the spindle support unit $27_2b$. The returning portion of the traction rope 31b formed by the traction rope section 31"b is guided in a hollow chamber 83b which is embodied separate from the guide cavity 57b in the bottom wall 53b of the guide housing 51b. The second traction rope section 41″b of the traction rope 41b is secured to the fixed point 45b of the clamping member 71b of the spindle support unit 27₂b, the returning portion of the traction rope 41b formed by this second traction rope section 41″b also being guided in a hollow chamber 83b of the guide housing 51b. There must be pointed out that in FIG. 6 the projection 79b to the left in the illustration belongs to the clamping member 71b of the spindle support unit 27₂b, whereas the projection indicated at the right side of this clamping member 71b belongs to the clamping member 71b of the spindle support unit 27₁b being closer to the runner assembly. The traction rope sections 31′b and 41′b as well as the respective fixed points 33b and 43b are not apparent from this FIG. 6, since they are hidden by the projections 79b in the line of vision of FIG. 6.

In the region of the longitudinal opening 59b the guide cavity 57b is covered by a cover band 85b in order to prevent the entry of dirt into the guide cavity 57d. The cover band can consist of metal or of synthetics and can either be passed over suitable reversing means through the runner assembly 9b or can be in driving connection with the runner assembly 9b and thus be reversed by reversing means at the ends of the guide housing 51b.

In FIG. 4 one can recognize that the reversing rollers 37b and 47b are supported on reversing roller carriers 87b. These reversing roller carriers 87b are connected with fastening flanges 88b which are releasably attached to the end faces of the guide housing 51b. The reversing rollers 37b, 47b and the reversing roller carriers 87b are encapsulated by encapsulating members 89b. The encapsulating members 89b are adjacent to the ends of the guide housing 51b through the mediation of the fastening flanges 88b and are either secured to the fastening flanges 88b or to the guide housing 51b so that the reversing rollers 37b, 47b together with the reversing roller carriers 87b can be mounted to the guide housing separately at first and thereafter the encapsulating members 89b can be affixed. The encapsulating members 89b in turn can be designed to be integral with the respective end unit 39b. Thus, simplification when assembling the linear guide device is guaranteed, because the traction ropes 31b, 41b can easily be placed over the still unencapsulated reversing rollers 37b, 47b and can be connected with the spindle support units. Tensioning of the traction ropes 31b, 41b can be effected, for example, in that the reversing rollers 37b, 47b are adjustable in respect of the reversing roller carriers 87b or these reversing roller carriers 87b are adjustable in respect of the guide housing 51b.

Figure 7:
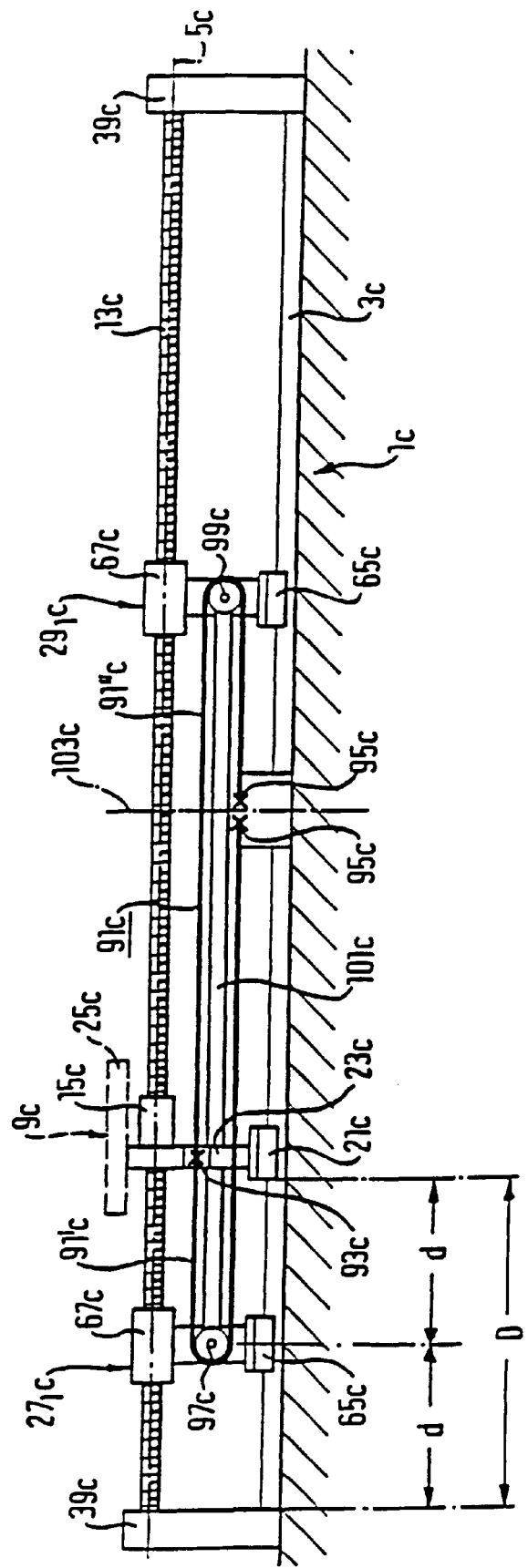
FIG. 7 schematically shows another embodiment of the linear guide device according to the invention in which two spindle support units arranged at both sides of the runner assembly are coupled to the runner assembly by means of a flexible speed changing means.
Figure 12:
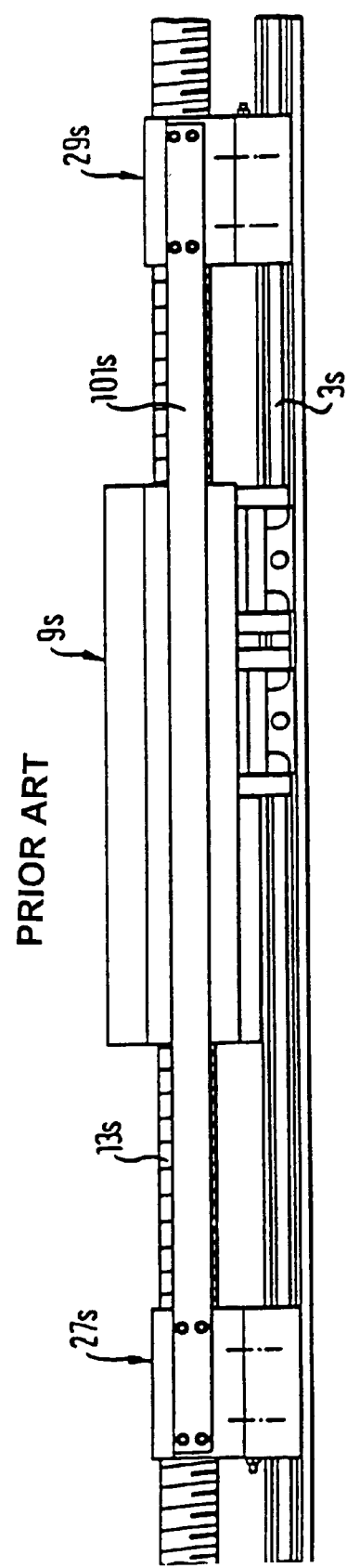
FIG. 12 is a side view of a linear guide device according to the prior art.
Figure 13:
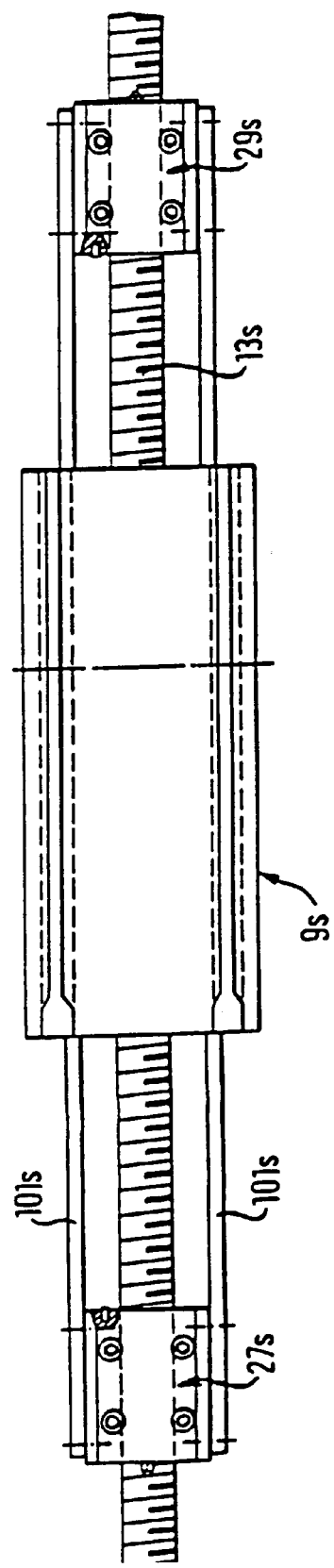
FIG. 13 is a top view of the linear guide device of FIG. 12.

In FIG. 7 an embodiment is shown in which two spindle support units 27₁c and 29₁c arranged at axially both sides of a runner assembly 9c are coupled with the runner assembly 9c by means of a drive rope 91c. The drive rope 91c effects a speed of the spindle support units 27₁c and 29₁c which is reduced from the movement speed of the runner assembly 9c. The drive rope 91c includes two rope sections 91′c and 91″c both of which are attached with their one end to a fixed point 93c at the runner assembly 9c and with their other end to a fixed point 95c situated approximately in the center of the guide base 1c. The rope section 91′c is guided from the fixed point 93c at the runner assembly 9c over a reversing roller 97c at the spindle support unit 27₁c back to the fixed point 95c at the guide base 1c. The rope section 91″c is guided from the fixed point 93c at the runner assembly 9c over a corresponding reversing roller 99c at the spindle support unit 29₁c back to the respective fixed point 95c at the guide base 1c. In this way the two spindle support units 27₁c, 29₁c are coupled to the runner assembly 9c in the way of a pulley block, this pulley block connection in the example at hand effecting a division in half of the speeds of the spindle support units 27₁c, 29₁c compared to the speed of the runner assembly 9c. A rigid connecting rod 101c between the spindle support units 27₁c, 29₁c ensures the synchronicity of the movements of the two spindle support units 27₁c, 29₁c. Contrary to the connecting rods 101s of the known embodiment according to FIGS. 12 and 13 this connecting rod 101c can have a relatively small cross-section, since it does not have to receive any great thrust forces and, consequently, there is no danger of buckling. The spindle support units 27₁c, 29₁c, namely, are braked by the rope connection with the runner assembly 9c when the speed of the runner assembly 9c is reduced when reaching an end of the guide base 1c so that they do not abut unbraked against the respective end of the guide base 1c.

The positioning of the spindle support units 27₁c and 29₁c with respect to the runner assembly 9c is such that they are symmetrical to the runner assembly 9c when the latter is in a center position along the guide base 1c, the center position having the reference numeral 103c. Herein, they are arranged approximately in the center between the runner assembly and the respective end of the guide base 1c. This positioning of the spindle support units 27₁c, 29₁c together with its movement speed half of that of the runner assembly 9c effects that the spindle support units 27₁c, 29₁ at all times subdivide the respective longitudinal distance between the runner assembly 9c and the respective end of the guide base 1c into substantially equally long partial distances. Expressed more correctly mathematically this means that the length d of all support-free spindle sections is always substantially the same on one side of the runner assembly 9c and approximately corresponds to the quotient of the longitudinal distance D, of the runner assembly 9c from the respective end of the guide base 1c to the number of spindle support units provided at that side of the runner assembly 9c. In the present example of FIG. 7 only one spindle support unit 27₁c or 29₁c, respectively, is on either side of the runner assembly 9c so that d is always approximately equal to D/2. There must be pointed out that these dimension relationships are only valid in strongly approximated form, since the longitudinal dimension of the runner assembly 9c as well as the longitudinal dimensions of the spindle support units must also be taken into account.

When the runner assembly 9c moves to the right in FIG. 7, due to the speed difference from the spindle support units 27₁c, 29₁c, it constantly approaches the spindle support unit 29₁c which lies ahead of it in the direction of movement, whereas it moves away constantly from the spindle support unit 27₁c which lies behind it. The runner assembly 9c catches up with the spindle support unit 29₁c when both of them reach the end of the guide base 1c to the right in FIG. 7. The spindle support unit 27₁c is then approximately in the center of the available displacement path along the guide base 1c, i.e. approximately at position 103c. For a movement of the runner assembly 9c to the left in FIG. 7, correspondingly reversed conditions apply.

Figure 8:
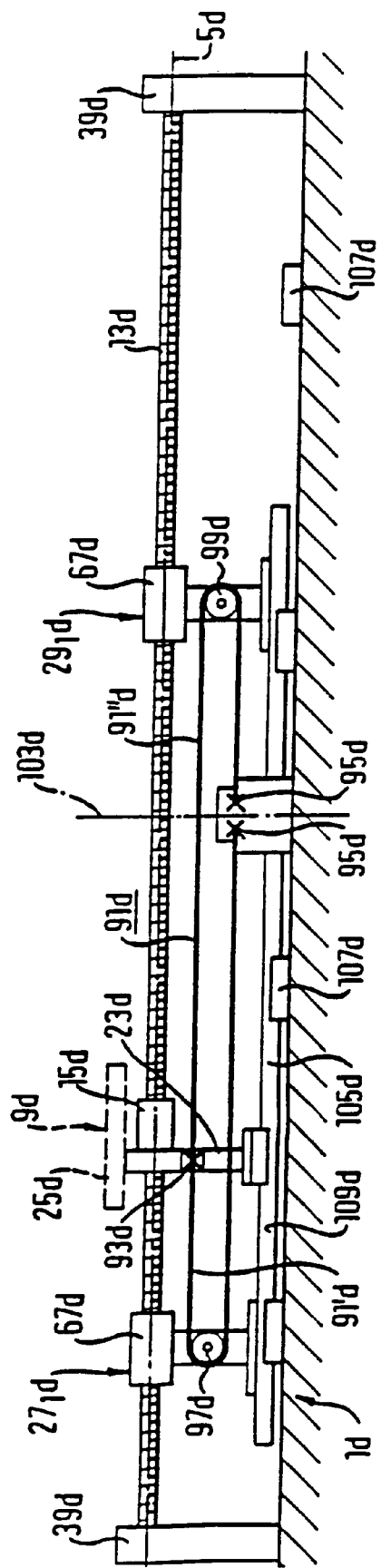
FIG. 8 schematically shows a modification of the linear guide device of FIG. 7.

FIG. 8 illustrates a modification of the linear guide device of FIG. 7 in which two spindle support units 27₁d and 29₁d are arranged fixedly on a secondary guide rail 105d which is guided for movement in rail guiding means 107d which are fixed to the guide base 1d. Optionally, a continuous guide bed can be provided for guiding the secondary guide rail 105d. The connecting rod 101c of FIG. 7 is not needed since its function of maintaining a distance is taken over by the guide rail 105d. The runner assembly 9d is not guided directly on the guide base 1d, but on the guide rail 105d which, for this purpose, comprises at least one separate guide surface 109d for the runner assembly 9d. This way of guidance of the runner assembly 9d and the spindle support units $27_1d$, $29_1d$ on the guide base 1d which deviates from the embodiment of FIG. 7 does not change the kinematics of the runner assembly 9d and the spindle support units $27_1d$ and $29_1d$.

Figure 9:
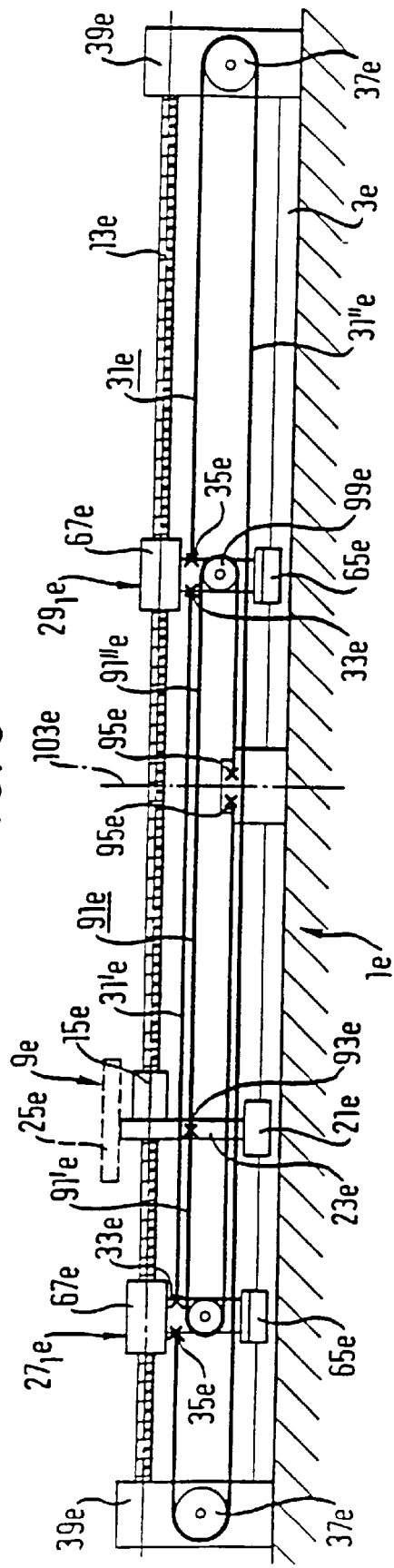
FIG. 9 schematically shows a further embodiment of the linear guide device according to the invention in which two spindle support units arranged at both sides of the runner assembly on the one hand are mutually adapted in their movements by a flexible pair coupling means, and on the other hand are coupled to the runner assembly by means of a flexible speed changing means.

FIG. 9 shows a possibility of combining the solutions according to FIGS. 1 and 7 with each other. The linear guide device shown in FIG. 9 corresponds to the embodiment of FIG. 7 except for the now missing connecting rod 101c. This connecting rod 101c is replaced in FIG. 9 by a traction rope 31e which assumes the same distance maintaining and pair coupling functions as the connecting rod 101c of FIG. 7. As in the solution according to FIG. 1, the traction rope 31e is closed to form an endless loop, engaging at fixed points 33e, 35e at the spindle support units $27_1e$, $29_1e$, is movably passed by the runner assembly 9e, and reversed by reversing rollers 37e supported at the ends of the guide base 1e.

Figure 10:
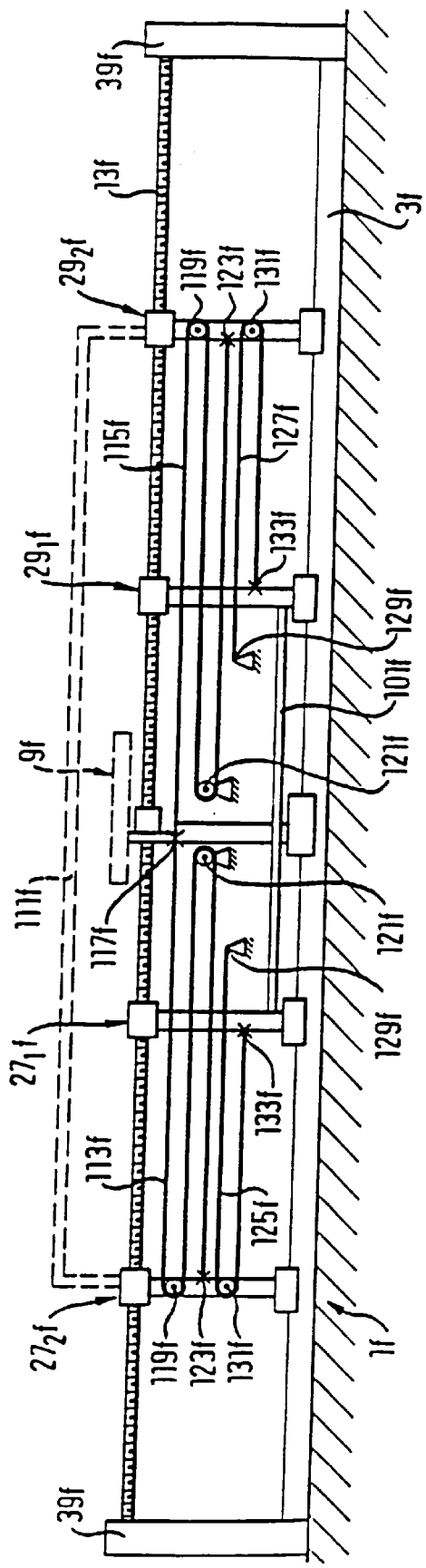
FIG. 10 schematically shows a further embodiment of the linear guide device according to the invention in which two pairs of spindle support units are arranged at both sides of the runner assembly, the spindle support units being coupled by a plurality of flexible speed changing means among each other as well as with the runner assembly.

In FIG. 10 a linear guide device is shown in which two spindle support units $27_1f$, $27_2f$ and $29f$, $29_2$ each are arranged axially on both sides of the runner assembly 9f. The spindle support units $27_1f$, $29_1f$ closer to the runner assembly are coupled for synchronous movement by means of a rigid connection rod 101f. Similarly, the spindle support units $27_2f$, $29_2f$ more distant from the runner assembly are coupled for synchronous movement by a connecting rod 111f which is only indicated in a dashed line. These two pairs of spindle support units are coupled among each other and with the runner assembly 9f by means of a rope system such that when the runner assembly 9f moves along the guide base 1f, the pair of spindle support units $27_1f$, $29_1f$ closer to the runner assembly moves along in the same direction at a speed which is ⅔ of the speed of the runner assembly 9f, and the pair of spindle support units $27_2f$, $29_2f$ more distant from the runner assembly moves along in the same direction at a speed which is ⅓ of the speed of the runner assembly 9f. In a center position of the runner assembly 9f along the guide basis 1f, the spindle support units are positioned symmetrically with respect to the runner assembly 9f, subdividing the respective longitudinal distance between the runner assembly 9f and the respective end of the guide base if in three approximately equal partial sections each. This initial positioning of the spindle support units together with the stated speed relationships has the same effect as in the solution according to FIG. 7. According thereto, during a movement of the runner assembly 9f in the direction towards an end of the guide base 1f, the spindle support units between the runner assembly 9f and this end of the guide base 1f approach each other continuously and approach the runner assembly 9f until finally when reaching the respective end of the guide base 1f they are directly adjacent. At the same time, the spindle support units between the runner assembly 9f and the respective other end of the guide base 1f continuously move away from each other and guarantee an optimum support of the drive spindle 13f in equal distances even if the runner assembly 9f has taken an end position along the guide base 1f.

The addressed rope system includes a first pair of drive ropes 113f, 115f which start from a fixed point 117f at the runner assembly 9f, are reversed by means of a first reversing roller 119f at the respective spindle support unit $27_2f$ or $29_2f$, respectively, a first time, run back to a second reversing roller 121f supported at the guide base 1f, are reversed there a second time and finally return to a fixed point 123f at the respective spindle support unit $27_2f$ or $29_2f$, respectively. These first drive ropes 113f, 115f reduce the speed of the pair of spindle support units $27_2f$, $29_2f$ to ⅓ of the speed of the runner assembly 9f. The rope system further includes two drive ropes 125f, 127f which couple the pair of spindle support units $27_1f$, $29_1f$ closer to the runner assembly to the pair of spindle support units $27_2f$, $29_2f$ more distant from the runner assembly. Each of the drive ropes 125f, 127f extends from a fixed point 129f at the guide base 1f to a third reversing roller 131f supported at the respective spindle support unit $27_2f$ or $29_2f$, respectively, and from there after a one-time reversal back to a fixed point 133f at the respective spindle support unit $27_1f$ or $29_1f$, respectively. These drive ropes 125f, 127f effect a doubling of the speed of the spindle support units $27_1f$, $29_1f$ compared to the speed of the spindle support units $27_2f$, $29_2f$ to ⅔ of the speed of the runner assembly 9f.

Figure 11:
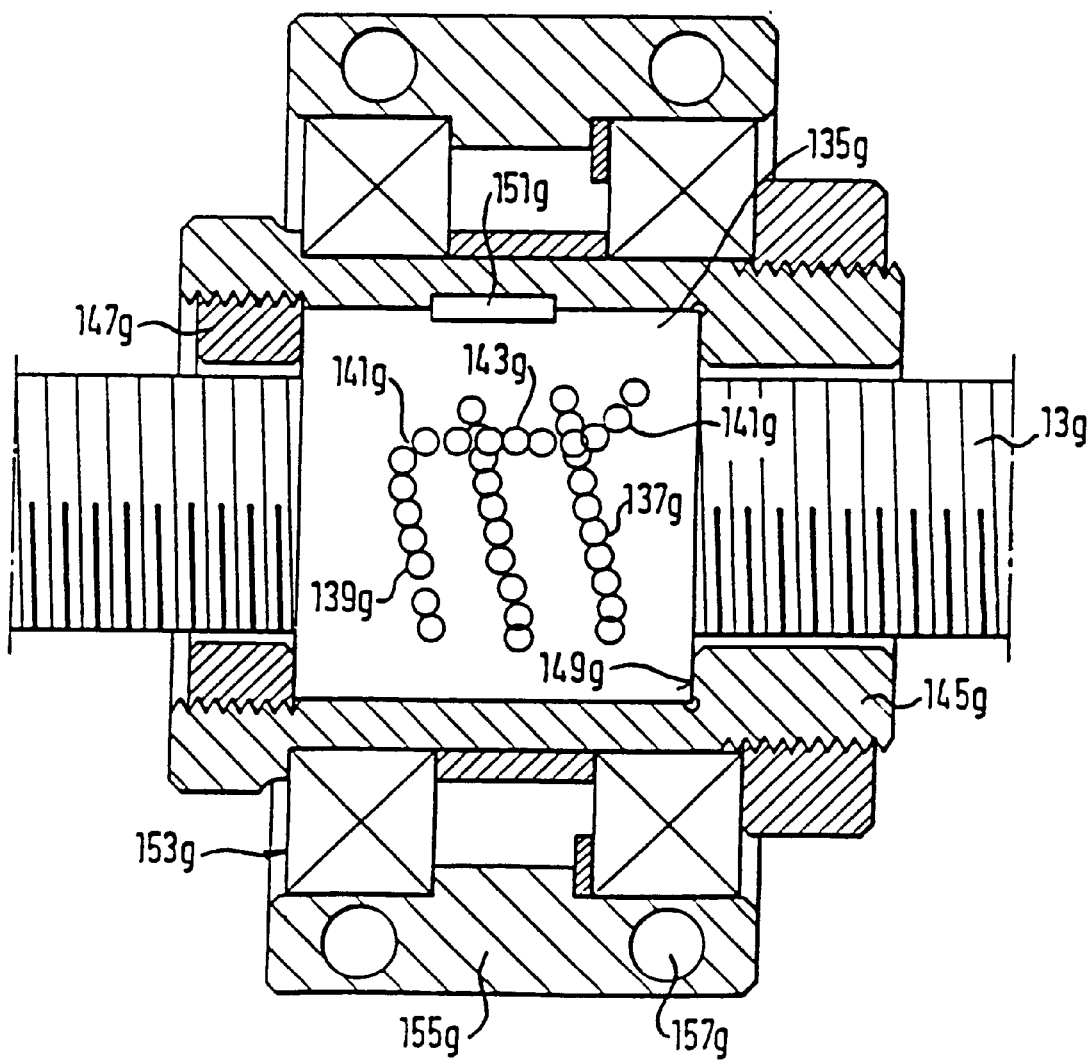
FIG. 11 is an embodiment of a spindle support unit having a support nut being in threaded engagement with a drive spindle.

FIG. 11 shows an example of a spindle support unit having a support nut 135g being in threaded engagement with a drive spindle 13g. The support nut 135g comprises at least one schematically indicated endless row of balls 137g which is formed of a portion 139g extending helically about the spindle axis, two arc portions 141g connected to this portion 139g, as well as a return portion 143g connecting the two arc portions 141g. The balls of the portion 139g are guided in a helically extending threaded groove not shown in greater detail in the inner circumferential surface of the support nut 135g. Simultaneously, they are in engagement with the outer circumferential surface of the drive spindle 13g which—as mentioned earlier—can be provided with a thread or can be smooth. The arc portions 141g and the return portion 143g of the row of balls 137g are guided in a return channel of the support nut 135g, which return channel is not shown in greater detail. The support nut 135g can be a conventional series part, as it is also used for common ball screw drives. It is inserted into a sleeve 145g and axially fixedly received therein by means of a securing ring 147g and an abutment shoulder 149g at the inner circumferential surface of the sleeve 145g. By means of a radially projecting nose 151g which engages into a respective recess in the inner circumferential surface of the sleeve 145g, the support nut 135g is non-rotatably connected with the sleeve 145g. The sleeve 145g in turn is received in an outer ring 155g via a ball or roller bearing means 153g, especially a radial or angular ball bearing means. This outer ring 155g is provided for non-rotatable connection with the guide member 65b (not shown in FIG. 11) of a spindle support unit of the linear guide device according to FIGS. 3 to 6 or with a housing not shown in greater detail which, finally, is guided on the guide base of the linear guide device for longitudinal movement.

If the arrangement shown in FIG. 11 is part of a spindle support unit which, as shown in FIGS. 7 to 10, is forcedly guided at a speed which is lower than that of the runner assembly, the bearing means 153g effect that, when rotating the drive spindle 13g, a compensation rotation of the support nut 135g can take place together with the sleeve 145g within the outer ring 155g, in order to realize the desired speed difference. If one wants to use the arrangement of FIG. 11 for a spindle support unit which is to stand still temporarily also during rotation of the drive spindle 13g as in the embodiments of FIGS. 1 to 6, the radial clearance in the bearing means 135g will be dimensioned so great and the radial clearance between the support nut 135g and the drive spindle 13g dimensioned so small and the pitch of the screw drive formed between the support nut 135g and the drive spindle 13g will be selected such that when rotating the drive spindle 13g the support nut 135g can rotate within the outer ring 155g together with the sleeve 145g at the same rotational speed as the drive spindle 13g, i.e. without relative rotation with respect to the drive spindle 13g, without the outer ring 155g and thus the entire spindle support unit experiencing an axial movement.

While specific embodiments of the invention have been shown and described in detail to illustrate the application of the inventive principles, it will be understood that the invention may be embodied otherwise without departing from such principles.

We claim:

1. A linear guide device, comprising a guide base having a longitudinal axis, a runner assembly guided for movement in the direction of said longitudinal axis relative to said guide base, a linear drive means for driving said runner assembly along said longitudinal axis, said linear drive means including a drive spindle supported at spindle ends for rotation relative to said guide base and fixed against axial movement in the region of at least one of said spindle ends, and including a spindle nut in driven engagement with said spindle and driving engagement with the runner assembly, respective axial distances being defined between said runner assembly and said spindle ends, at least one pair of spindle support units with a respective spindle support unit of said pair being arranged within each of said axial distances, said spindle support units each being guided relative to said runner assembly on said guide base in the direction of said longitudinal axis and being movable within a respective axial distance in dependence on movements of said runner assembly, and flexible traction means for providing a mutual dependence of movement of the spindle support units of said at least one pair of spindle support units, wherein said guide base includes a guide housing having walls defining a guide cavity, said runner assembly and said spindle support units are received within said guide cavity, said runner assembly has a portion that extends through a longitudinal opening of said guide housing and is adapted outside of said guide cavity for receiving an object to be moved in the direction of said longitudinal axis, and at least a portion of said flexible traction means extends within said guide cavity, at least a subportion of said portion of said flexible traction means being received within a traction means receiving groove which is open towards said guide cavity and is formed in one of said walls defining said guide cavity.

2. A linear guide device, comprising a guide base having a longitudinal axis, a runner assembly guided for movement in the direction of said longitudinal axis relative to said guide base, a linear drive means for driving said runner assembly along said longitudinal axis, said linear drive means including a drive spindle supported at spindle ends for rotation relative to said guide base and fixed against axial movement in the region of at least one of said spindle ends, and including a spindle nut in driven engagement with said spindle and driving engagement with the runner assembly, respective axial distances being defined between said runner assembly and said spindle ends, at least one pair of spindle support units with a respective spindle support unit of said pair being arranged within each of said axial distances, said spindle support units each being guided relative to said runner assembly on said guide base in the direction of said longitudinal axis and being movable within a respective axial distance in dependence on movements of said runner assembly, and flexible traction means for providing a mutual dependence of movement of the spindle support units of said at least one pair of spindle support units, wherein said guide base includes a guide housing having walls defining a guide cavity, said runner assembly and said spindle support units are received within said guide cavity, said runner assembly has a portion that extends through a longitudinal opening of said guide housing and has a portion outside of said guide cavity adapted for receiving an object to be moved in the direction of said longitudinal axis, and at least a portion of said flexible traction means extends within a traction means receiving channel separate from said guide cavity.

3. The linear guide device according to claim 1 or claim 2, wherein at least two pairs of spindle support units are provided with a respective spindle support unit of each of said pairs being arranged within each of said axial distances, a first one of said pairs of spindle support units forming a pair closer to said runner assembly and a second one of said pairs forming a pair more distant from said runner assembly, the movements of said spindle support units being mutually adapted at least among one of said pairs.

4. The linear guide device according to claim 1 or claim 2, wherein said flexible traction means are arranged for mutually adapting axial movements of said spindle support units of said at least one pair, said flexible traction means contributing to provide a closed spindle support unit displacement loop and comprising a first flexible traction section extending between said spindle support units of said at least one pair via a respective motion reversing unit provided adjacent each of said spindle ends in substantially stationary relationship with respect to said spindle ends, said first flexible traction section being fixedly attached to both said spindle support units of said at least one pair.

5. The linear guide device according to claim 4, wherein at least two pairs of spindle support units are provided, the spindle support units of each of said pairs being mutually adapted in their axial movements by respective flexible traction means.

6. The linear guide device according to claim 4, wherein said flexible traction means further comprise a second flexible traction section movably running past said runner assembly and extending directly between said spindle support units of said at least one pair substantially parallel to said longitudinal axis, said second flexible traction section being fixedly attached to both said spindle support units of said at least one pair, and wherein respective groups of mutually engageable abutment portions are allocated to said runner assembly and each of said spindle support units of said at least one pair, both said spindle support units of said at least one pair being commonly displaceable in a respective longitudinal direction along said longitudinal axis in response to movement of said runner assembly in said respective longitudinal direction by abutting engagement of a respective one of said groups of abutment portions.

7. The linear guide device according to claim 6 wherein at least two pairs of spindle support units are provided with a respective spindle support unit of each of said pairs being arranged within each of said axial distances, a first one of said pairs of spindle support units forming a pair closer to said runner assembly and a second one of said pairs forming a pair more distant from said runner assembly, at least the spindle support units of said second pair being mutually adapted in their axial movements by said flexible traction means, the spindle support units of said second pair being commonly displaceable along said longitudinal axis by means of abutting engagement of a respective one of the spindle support units of said first pair and an adjacent one of the spindle support units of said second pair.

8. The linear guide device according to claim 1 or claim 2, wherein at least one of said spindle support units includes a spindle embracing member made of a material having a low coefficient of friction, said spindle embracing member having a through-bore, and said spindle extending through said through-bore for sliding movement.

9. The linear guide device according to claim 1 or claim 2, wherein at least one of said spindle support units includes a support nut in threaded engagement with said drive spindle, said support nut being supported in said spindle support unit against axial movement and for rotation relative to said spindle support unit such that a difference between a speed of axial movement of said runner assembly and a speed of axial movement of said spindle support unit is permitted by rotation of said support nut relative to said spindle support unit.

10. The linear guide device according to claim 9, wherein said spindle support unit includes a ball screw drive having at least one endless row of balls which on a part of its length follows a thread path on an inner circumferential surface of said support nut and extends o n a remaining path through a return channel of said support nut.

11. The linear guide device according to claim 1 or claim 2, wherein said guide base comprises at least one guide surface on which said runner assembly and said spindle support units are guided.

12. The linear guide device according to claim 1 or claim 2, wherein at least one guide surface is provided on said guide base for guiding each said spindle support unit and said runner assembly.

13. The linear guide device according to claim 1 or claim 2, wherein within said guide cavity at least one guide rail is mounted to said guide housing for guiding at least one of said runner assembly and said spindle support units.

14. The linear guide device according to claim 2, wherein a portion of said flexible traction means extends within said guide cavity.

15. The linear guide device according to claim 14, wherein said portion of said flexible traction means is received within a traction means receiving groove which is open towards said guide cavity and is formed in one of said walls defining said guide cavity.

16. The linear guide device according to claim 15, wherein said portion of the traction means received in said traction means receiving groove is movably guided past a contour portion of said runner assembly, said contour portion being adjacent said traction means receiving groove.

17. The linear guide device according to claim 16, wherein said portion of the traction means received within said traction means receiving groove is secured to a projection on one of said spindle support units, which projection extends into said traction means receiving groove.

18. The linear guide device according to claim 1, wherein at least a portion of said flexible traction means extends within a traction means receiving channel separate from said guide cavity.

19. The linear guide device according to claim 1 or claim 2, wherein said guide cavity is covered by a cover band in the region of its longitudinal opening which cover band is in driving connection with said runner assembly.

20. The linear guide device according to claim 1 or claim 2, wherein said flexible traction means run in at least one end portion of said guide housing over a motion reversing unit enclosed within a cover, said motion reversing unit being mountable separately from said cover in the respective end portion of said guide housing, said cover being mountable over said motion reversing unit after the motion reversing unit is mounted on said guide housing.

21. The linear guide device according to claim 15, wherein there are two pairs of spindle support units, and the portion of the traction means for one of the pairs of spindle support units that is received in said traction means receiving groove is movably guided past said runner assembly and the spindle support units of the other pair of spindle support units.

22. The linear guide device according to claim 1 or claim 2, wherein said guide cavity is covered by a cover band in the region of its longitudinal opening which cover band is movably guided through said runner assembly.

23. A linear guide device, comprising
a guide base having a longitudinal axis,
a runner assembly guided for movement in the direction of said longitudinal axis relative to said guide base,
a linear drive means for driving said runner assembly along said longitudinal axis, said linear drive means including a drive spindle supported at spindle ends for rotation relative to said guide base and fixed against axial movement in the region of at least one of said spindle ends, and including a spindle nut in driven engagement with said spindle and driving engagement with the runner assembly, respective axial distances being defined between said runner assembly and said spindle ends,
at least one pair of spindle support units with a respective spindle support unit of said pair being arranged within each of said axial distances, said spindle support units each being guided relative to said runner assembly on said guide base in the direction of said longitudinal axis and being movable within a respective axial distance in dependence on movements of said runner assembly, and
flexible traction means for providing a mutual dependence of movement of said spindle support units of said at least one pair, said flexible traction means contributing to provide a closed spindle support unit displacement loop and including a first flexible traction section extending between said spindle support units of said at least one pair via respective motion reversing units provided adjacent each of said spindle ends in substantially stationary relationship with respect to said spindle ends, and further including a second flexible traction section movably running past said runner assembly and extending directly between said spindle support units of said at least one pair substantially parallel to said longitudinal axis, said first and second flexible traction sections being fixedly attached to both said spindle support units of said at least one pair,
wherein respective groups of mutually engageable abutment portions are allocated to said runner assembly and each of said spindle support unite of said at least one pair and both said spindle support units of said at least one pair are commonly displaceable in a respective longitudinal direction along said longitudinal axis in response to movement of said runner assembly in said respective longitudinal direction by abutting engagement of a respective one of said groups of abutment portions.

24. The linear guide device according to claim 23 wherein at least two pairs of spindle support units are provided with a respective spindle support unit of each of said pairs being arranged within each of said axial distances, a first one of said pairs of spindle support units forming a pair closer to said runner assembly and a second one of said pairs forming a pair more distant from said runner assembly, at least the spindle support units of said second pair being mutually adapted in their axial movements by said flexible traction means, the spindle support units of said second pair being commonly displaceable along said longitudinal axis by means of abutting engagement of a respective one of the spindle support units of said first pair and an adjacent one of the spindle support units of said second pair.

25. The linear guide device according to claim 23 wherein said guide base includes a guide housing having walls defining a guide cavity, said runner assembly and said spindle support units being received within said guide cavity, said runner assembly extending through a longitudinal opening of said guide housing and being adapted outside of said guide cavity for receiving an object to be moved in the direction of said longitudinal axis.

26. The linear guide device according to claim 23, wherein at least one of said spindle support units includes a spindle embracing member made of a material having a low coefficient of friction, said spindle embracing member having a through-bore, and said spindle extending through said through-bore for sliding movement.

27. The linear guide device according to claim 23, wherein at least one of said spindle support units includes a support nut in threaded engagement with said drive spindle, said support nut being supported in said spindle support unit against axial movement and for rotation relative to said spindle support unit such that a difference between a speed of axial movement of said runner assembly and a speed of axial movement of said spindle support unit is permitted by rotation of said support nut relative to said spindle support unit.

28. The linear guide device according to claim 23, wherein said guide base comprises at least one guide surface on which said runner assembly and said spindle support units are guided.

29. The linear guide device according to claim 23, wherein at least one guide surface is provided on said guide base for guiding each said spindle support unit and said runner assembly.

30. The linear guide device according to claim 25, wherein within said guide cavity at least one guide rail is mounted to said guide housing for guiding at least one of said runner assembly and said spindle support units.

31. The linear guide device according to claim 25, wherein at least a portion of said flexible traction means extends within said guide cavity.

32. The linear guide device according to claim 31, wherein said portion of said flexible traction means is received within a traction means receiving groove which is open towards said guide cavity and is formed in one of said walls defining said guide cavity.

33. The linear guide device according to claim 32, wherein said portion of said traction means received in said traction means receiving groove is movably guided past a contour portion of said runner assembly, said contour portion being adjacent said traction means receiving groove.

34. The linear guide device according to claim 33, wherein said portion of said traction means received within said traction means receiving groove is secured to a projection of at least one of said spindle support units, which projection extends into said traction means receiving groove.

35. The linear guide device according to claim 25, wherein at least a portion of said flexible traction means extends within a traction means receiving channel separate from said guide cavity.

36. The linear guide device according to claim 25, wherein said guide cavity is covered by a cover band in the region of its longitudinal opening which cover band is in driving connection with said runner assembly.

37. The linear guide device according to claim 25, wherein said motion reversing units are mounted on respective end portions of said guide housing, and a cover is mountable over each said motion reversing unit after the motion reversing unit is mounted on said guide housing.

38. The linear guide device according to claim 27, wherein said spindle support unit includes a ball screw drive having at least one endless row of balls which on a part of its length follows a thread path on an inner circumferential surface of said support nut and extends on a remaining path through a return channel of said support nut.

39. The linear guide device according to claim 25, wherein said guide cavity is covered by a cover band in the region of its longitudinal opening which cover band is movably guided through said runner assembly.

* * * * *

UNITED STATES PATENT AND TRADEMARK OFFICE
CERTIFICATE OF CORRECTION

PATENT NO. : 5,974,904

DATED : Nov. 2, 1999

INVENTOR(S) : Dirschbacher et al.

It is certified that error appears in the above-identified patent and that said Letters Patent is hereby corrected as shown below:

COVER SHEET:

[57] ABSTRACT, line 8: "rcpe" should read -- rope --.

[75] Inventors: "Rossteuscher" should read -- Roßteuscher --.

IN THE CLAIMS:

Column 21, claim 10, line 26: "o n a" should read --on a--.

Column 24, claim 32, line 8: "i s" should read --is--.

Signed and Sealed this

Third Day of April, 2001

Attest:

NICHOLAS P. GODICI

*Attesting Officer*    *Acting Director of the United States Patent and Trademark Office*